(12) United States Patent
Fries

(10) Patent No.: US 9,852,223 B2
(45) Date of Patent: Dec. 26, 2017

(54) ENHANCING SEARCH RESULTS WITH SOCIAL NETWORKING DATA

(71) Applicant: Kevin Patrick Fries, Granite Bay, CA (US)

(72) Inventor: Kevin Patrick Fries, Granite Bay, CA (US)

(73) Assignee: eBay Inc., San Jose, CA (US)

( * ) Notice: Subject to any disclaimer, the term of this patent is extended or adjusted under 35 U.S.C. 154(b) by 180 days.

(21) Appl. No.: 13/722,449

(22) Filed: Dec. 20, 2012

(65) Prior Publication Data

US 2014/0181082 A1    Jun. 26, 2014

(51) Int. Cl.
*G06F 17/30*  (2006.01)
*G06Q 50/00*  (2012.01)
*G06Q 30/06*  (2012.01)

(52) U.S. Cl.
CPC ... *G06F 17/30867* (2013.01); *G06Q 30/0633* (2013.01); *G06Q 50/01* (2013.01)

(58) Field of Classification Search
CPC .......... G06F 17/30867; G06Q 30/0633; G06Q 50/01
See application file for complete search history.

(56) References Cited

U.S. PATENT DOCUMENTS

| | | | | |
|---|---|---|---|---|
| 8,364,666 | B1 * | 1/2013 | Katzir | 707/723 |
| 8,494,978 | B2 * | 7/2013 | Pinckney | G06N 99/005 706/11 |
| 8,799,276 | B1 * | 8/2014 | Hyatt | G06F 17/30867 707/723 |
| 9,159,034 | B2 * | 10/2015 | Pinckney | G06N 99/005 |
| 9,280,580 | B1 * | 3/2016 | Lider | G06F 17/30424 |
| 2006/0271460 | A1 * | 11/2006 | Hanif | G06Q 20/102 705/35 |
| 2007/0106659 | A1 * | 5/2007 | Lu et al. | 707/5 |
| 2007/0112738 | A1 * | 5/2007 | Livaditis | 707/3 |
| 2008/0052371 | A1 * | 2/2008 | Partovi et al. | 709/217 |
| 2008/0301112 | A1 * | 12/2008 | Wu | G06Q 30/02 |
| 2010/0030766 | A1 * | 2/2010 | Li et al. | 707/5 |
| 2010/0114955 | A1 * | 5/2010 | Thayer | 707/780 |
| 2010/0250526 | A1 * | 9/2010 | Prochazka | G06F 17/30672 707/723 |
| 2011/0125744 | A1 * | 5/2011 | Immonen | G06F 17/30241 707/737 |
| 2011/0252011 | A1 * | 10/2011 | Morris | H04L 51/32 707/706 |
| 2012/0089581 | A1 * | 4/2012 | Gupta | G06Q 30/00 707/706 |
| 2012/0158720 | A1 * | 6/2012 | Luan | G06F 17/30867 707/732 |
| 2012/0166433 | A1 * | 6/2012 | Tseng | G06Q 30/0224 707/728 |

(Continued)

*Primary Examiner* — Tyler Torgrimson
(74) *Attorney, Agent, or Firm* — Schwegman Lundberg & Woessner, P.A.

(57) ABSTRACT

A method of enhancing search results pertaining to an item with information about the item from a social network is disclosed. It is detected that a user is searching for information about the item in a context outside of a social networking context. Data relating to the item is collected from a social network of the user. A notification of the data relating to the item is generated to supplement a search result that is to be presented to the user in response to the searching.

13 Claims, 9 Drawing Sheets

(56) References Cited

U.S. PATENT DOCUMENTS

2012/0284256 A1* 11/2012 Mahajan ............. G06F 17/3087
                                                  707/722
2013/0179428 A1*  7/2013 Archambault .... G06F 17/30864
                                                  707/711
2013/0332460 A1* 12/2013 Pappas .............. G06F 17/30705
                                                  707/740
2014/0108383 A1*  4/2014 Chan ...................... G06Q 50/01
                                                  707/722

* cited by examiner

ENHANCING SEARCH RESULTS WITH SOCIAL NETWORKING DATA

TECHNICAL FIELD

This application relates generally to the technical field of internet commerce and, in one specific example, to enhancing a result of an online search for information about an item with information derived from a social network of the user conducting the online search.

BACKGROUND

When a user searches for information about an item, the user may receive various details about the item. For example, if the user searches for the item on Google®, the user may be presented with a list of Uniform Resource Locators (URLs) of web pages containing information relevant to the item. Or, if the user searches for information about an item from a local commerce application, the user may receive information pertaining to local commerce of the item, such as local stores that have the item in stock, the prices for the item at the local stores, and so on. Furthermore, the user may be given the option to purchase the item from a local store so that the item is waiting for the user at the local store. Some local commerce applications, such as RedLaser®, may incorporate barcode-scanning technology, which allows the user to scan a barcode of the item to receive the information about the item.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface. As used herein, the term "item" refers to a good or a service that is capable of being listed on a network-based publication system (e.g., eBay®, Craigslist®, or Amazon.com®).

In various embodiments, a method of enhancing search results pertaining to an item with information about the item from a social network is disclosed. It is detected that a user is searching for information about the item in a context outside of a social networking context. Data relating to the item is collected from a social network of the user. A notification of the data relating to the item is generated to supplement a search result that is to be presented to the user in response to the searching.

This method and other methods or embodiments disclosed herein may be implemented as a computer system having one or more modules (e.g., hardware modules or software modules). This method and other methods or embodiments disclosed herein may be embodied as instructions stored on a machine-readable medium that, when executed by a processor, cause the processor to perform the method.

Figure 1:
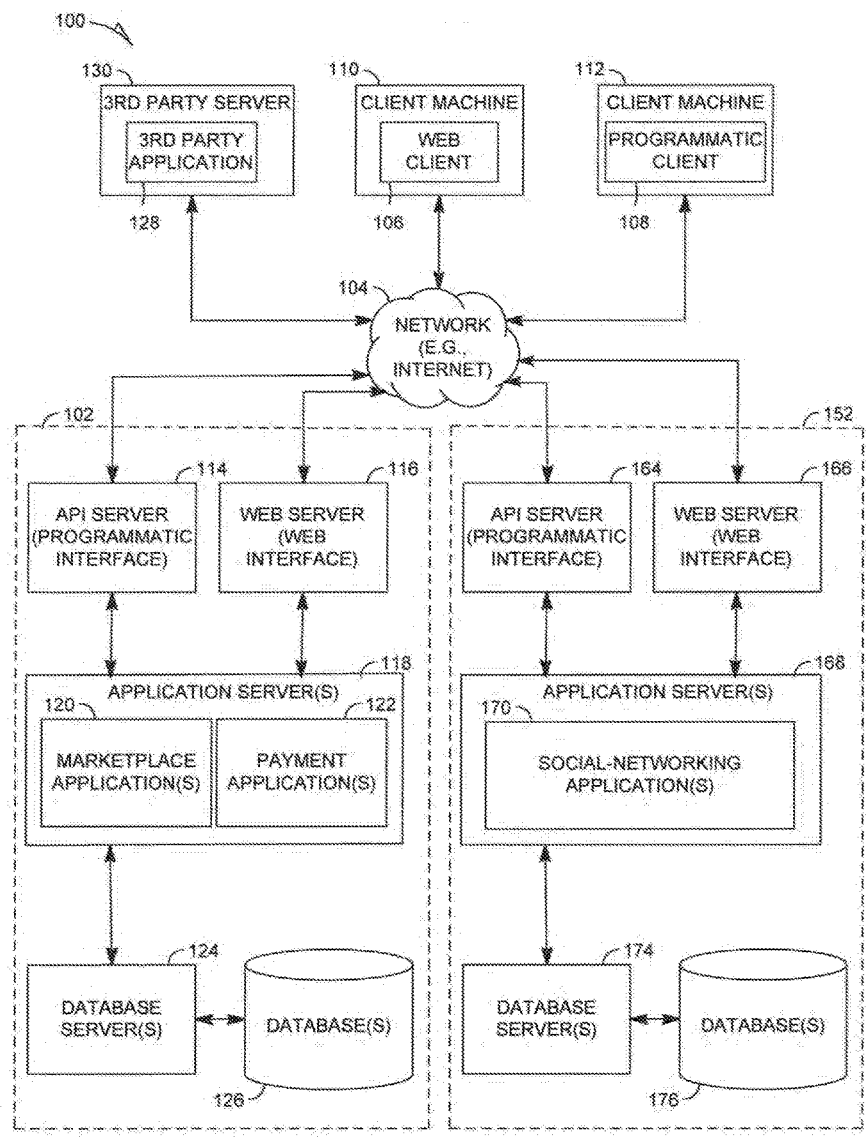
FIG. 1 is a network diagram depicting a client-server system within which various example embodiments may be deployed.

FIG. 1 is a network diagram depicting a client-server system 100, within which various example embodiments may be deployed. A networked system 102, in the example forms of a network-based publication system or other communication system, provides server-side functionality, via a network 104 (e.g., the Internet or Wide Area Network (WAN)) to one or more clients. FIG. 1 illustrates, for example, a web client 106 (e.g., a browser, such as the Internet Explorer® browser developed by Microsoft® Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

Within the networked system 102, an API server 114 and a web server 116 are coupled to, and provide programmatic and web interfaces respectively to, one or more application servers 118. The application servers 118 host one or more applications (e.g., marketplace application(s) 120 and payment application(s) 122). The application servers 118 are, in turn, shown to be coupled to one or more databases servers 124 that facilitate access to one or more databases or NoSQL or non-relational data stores 126.

An additional networked system 152, in the example forms of a social networking system or other communication system provides server-side functionality, via a network 104 to the one or more clients.

Within the networked system 152, an API server 164 and a web server 166 are coupled to, and provide programmatic and web interfaces respectively to, one or more application servers 168. The application servers 168 host one or more applications (e.g., social networking application(s) 170). The application servers 168 are, in turn, shown to be coupled to one or more databases servers 174 that facilitate access to one or more databases or NoSQL or non-relational data stores 176.

The applications 120, 122, and 170 may provide a number of functions and services to users who access the networked systems 102 and 152. While the applications are shown in FIG. 1 to form part of the networked systems 102 and 152, in alternative embodiments, the applications may form part of a service that is separate and distinct from the networked systems 102 and 152.

Further, while the system 100 shown in FIG. 1 employs a client-server architecture, various embodiments are, of course, not limited to such an architecture, and could equally well find application in a distributed, or peer-to-peer, architecture system, for example. The various applications could also be implemented as standalone software programs, which do not necessarily have computer networking capabilities. Additionally, although FIG. 1 depicts machines 130, 110, and 112 as being coupled to a networked system 102 and networked system 152, it will be readily apparent to one skilled in the art that machines 130, 110, and 112, as well as client 128, 106, and 108, may be coupled to multiple additional networked systems. For example, the clients 128, 106, and 108 may be coupled to multiple applications, such as payment applications 122 associated with multiple payment processors (e.g., Visa®, MasterCard®, and American Express®).

The web client 106 accesses the various applications 120, 122, and 170 via the web interface supported by the web server 116 or the web server 166 respectively. Similarly, the programmatic client 108 accesses the various services and functions provided by the applications 120, 122, and 170 via the programmatic interface provided by the API server 114 and API server 164, respectively. The programmatic client 108 may, for example, perform batch-mode communications between the programmatic client 108 and the networked systems 102 and 152.

FIG. 1 also illustrates a third party application 128, executing on a third party server machine 130, as having programmatic access to the networked systems 102 and 152 via the programmatic interface provided by the API server 114 and the API server 164, respectively. For example, the third party application 128 may, utilizing information retrieved from the networked systems 102 and 152, support one or more features or functions on a website hosted by the third party. The third party website may, for example, provide one or more promotional, social-networking, or payment functions that are supported by the relevant applications of the networked system 102.

Figure 2:
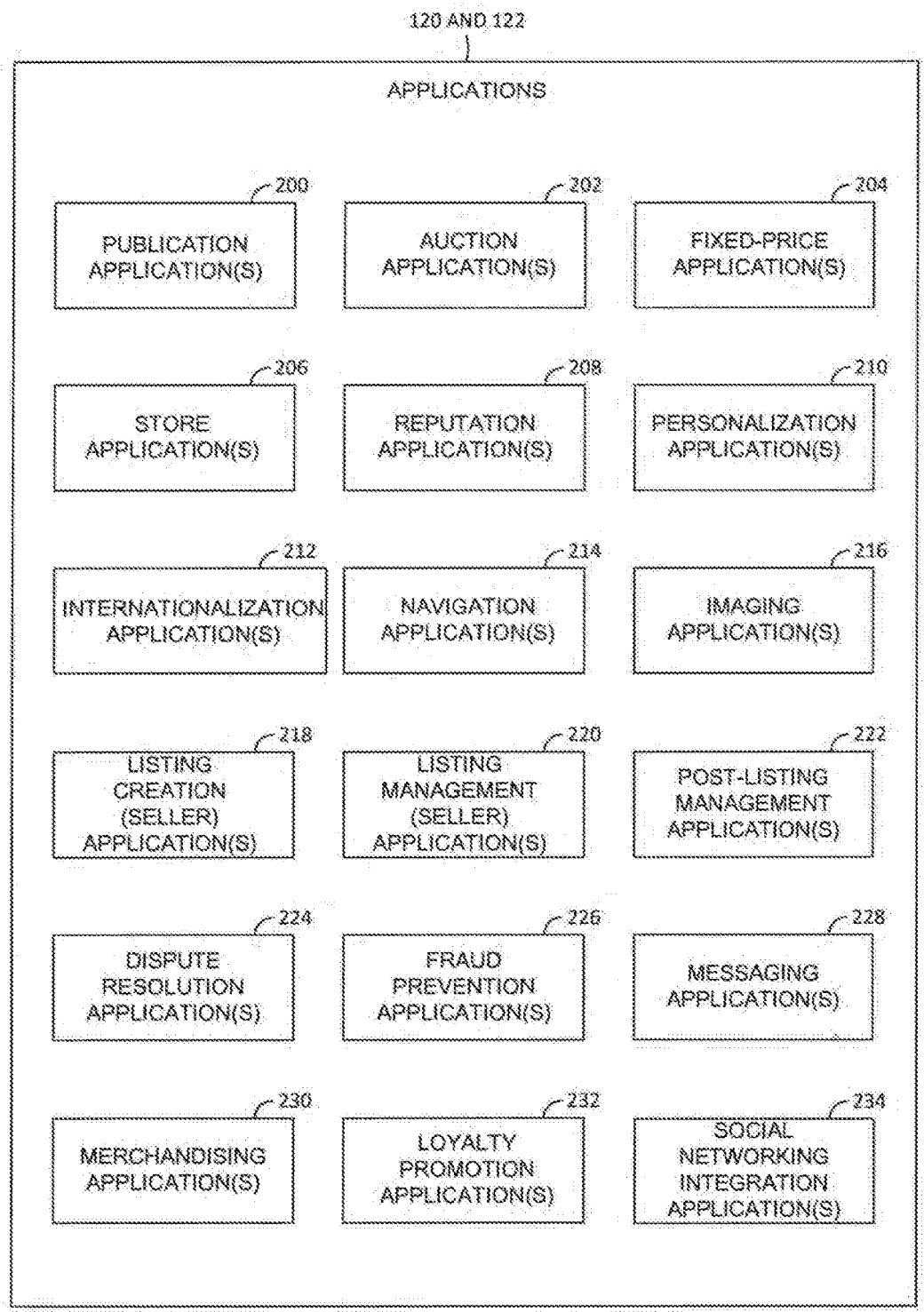
FIG. 2 is a block diagram illustrating multiple applications that, in one example embodiment, are provided as part of the networked system of FIG. 1.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122, or so as to allow the applications 120 and 122 to share and access common data. The applications 120 and 122 may furthermore access one or more databases 126 via the database servers 124 of FIG. 1.

The networked system 102 (FIG. 1) may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, in FIG. 2, the marketplace and payment applications 120 and 122 are shown to include at least one publication application 200 and one or more auction applications 202, which support auction-format listing and price setting mechanisms (e.g., English. Dutch, Vickrey, Chinese, Double, Reverse auctions etc.). The various auction applications 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 204 may support fixed-price listing formats (e.g., the traditional classified advertisement-type listing or a catalogue listing) and buy-out-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116 (FIG. 1).

Navigation of the networked system 102 may be facilitated by one or more navigation applications 214. In order to make listings available via the networked system 102 as visually informing and attractive as possible, the marketplace and payment applications 120 and 122 may include one or more imaging applications 216, which users may utilize to upload images for inclusion within listings. The imaging applications 216 also operate to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Social networking integration application(s) 234 may support interfacing between the system 102 and an additional system (e.g., the social-networking system 152). For example, the social networking integration application(s) 234 may allow the system 102 to access a Facebook account of a user (e.g., on social-networking system 152) to collect information from a social network of the user, including information about items listed on the system 102 that are referred to in wall or other postings made by additional users that are visible to the user or other content pertaining to such items that is accessible (e.g., via API calls) to systems external to the additional system.

Figure 3:
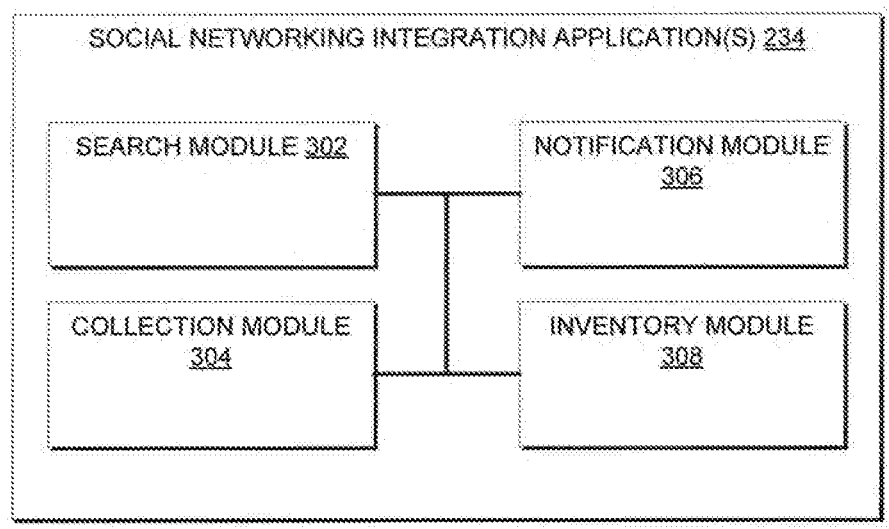
FIG. 3 is a block diagram illustrating example modules of the social networking integration application(s) of FIG. 2.

FIG. 3 is a block diagram illustrating example modules of the social networking integration application(s) 234 of FIG. 2. The search module 302 may be configured to detect that a user is searching for information about an item at a first system. The collection module 304 may be configured to collect additional information about the item from a second system. In various embodiments, the second system is external from the first system. The notification module 306 may be configured to generate a notification of the additional information. The notification may be integrated into a presentation of search results pertaining to a search query entered by the user with respect to the first system. The inventory module 308 may receive, store, and retrieve information about items in personal inventories of users.

Figure 4:
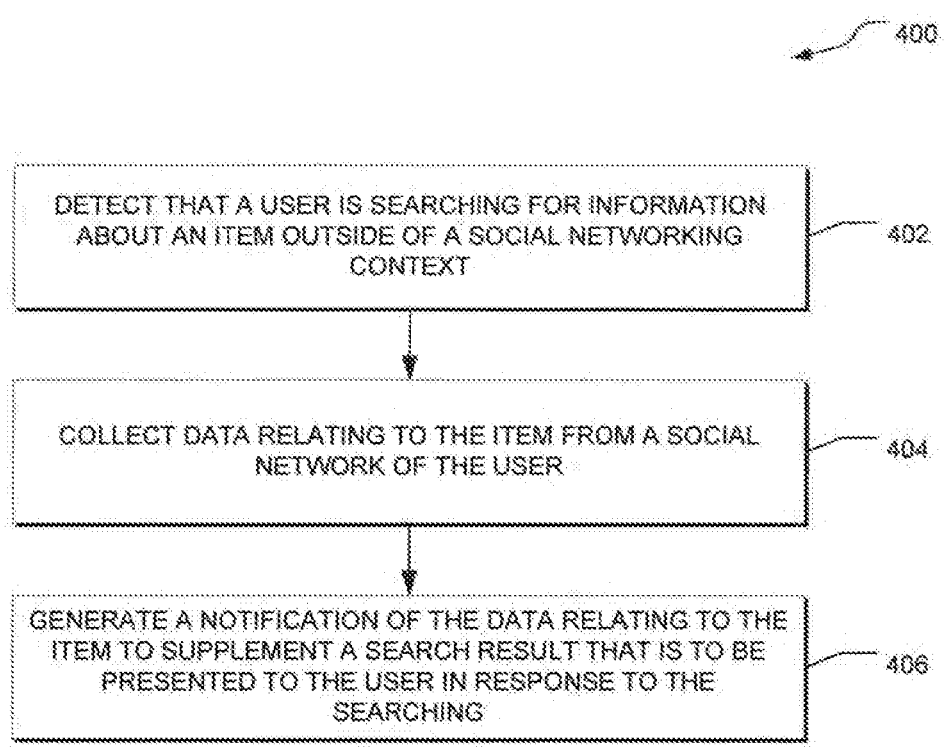
FIG. 4 is a flow chart illustrating an example method of supplementing a presentation of search results pertaining to an item with information about the item collected from a social network of a user.

FIG. 4 is a flow chart illustrating an example method 400 of supplementing a presentation of search results pertaining to an item with information about the item collected from a social network of a user. In various embodiments, the method 400 may be implemented by modules of the social networking integration application(s) 234. At operation 402, the search module determines that the user is searching for information about the item outside of a social networking context. For example, the search module receives a notification that a user has scanned a bar code associated with the item (e.g., via a mobile local commerce application, such as a RedLaser application executing on a mobile phone of the user). Or the search module determines that the user has entered a search query that includes keywords associated with the item.

At operation 404, the collection module collects data relating to the item from a social network of the user. For example, the collection module accesses an account of the user on a social networking system (e.g., Facebook) and identifies data items pertaining to the item that are in data feeds that are accessible to the user. Such data feeds may include data feeds made visible to the user by friends of the user or other users of the social networking system.

At operation 406, the notification module generates a notification of the data relating to the item. The notification may supplement a search result that is to be presented to the user in response to the searching. For example, if the search module detects that the user is searching for a local store that has a particular brand of an Android tablet personal computer in stock (e.g., based on a scanning of a bar code by the user via a local commerce application), the notification module may generate a notification that includes various information, such as additional users in the user's social network that own the item, comments that additional users have made pertaining to the item, ratings by the additional users of the item, information about ownership of the item by the additional users, whether the additional users are willing to sell the item, and so on. The notification module may filter or sort the data relating to the item based on various factors, such as the relatedness of an source or author of the data item to the user, a geographical or topographical closeness of the source or author of the data item to the user, a relevance of the data item to the user's search based on, for example, attributes of a publisher of the data item (e.g., whether the publisher of the data item is a current owner or past owner of the item for which the user seeks information). This notification may then be presented to the user to enhance standard search results, such as the names and locations of nearby stores that have the item in stock, that are presented to the user in response to the query entered by the user.

Figure 5:
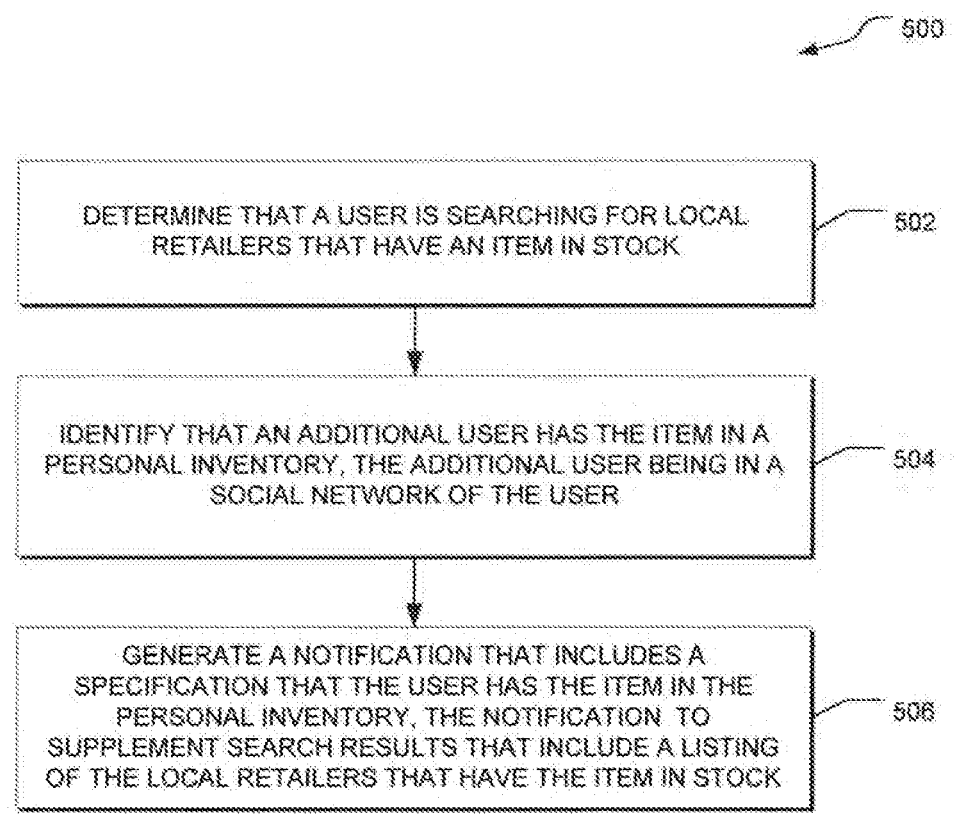
FIG. 5 is a flow chart illustrating an example method of notifying a user who is looking for a local store that has an item in stock of an additional user in the user's social network who owns the item.

FIG. 5 is a flow chart illustrating an example method 500 of notifying a user who is looking for a local store that has an item in stock of an additional user in the user's social network who owns the item. In various embodiments, the method 500 may be implemented by modules of the social networking integration application(s) 234. At operation 502, the search module determines that the user is searching for local retailers that have an item in stock. In various embodiments, the search module determines a specific model number or version of the item that the user is searching for (e.g., based on keywords entered by the user). For example, the search module may determine that the user is searching specifically for an iPhone 5, and not other versions of the iPhone.

At operation 504, the collection module identifies that an additional user has the item in a personal inventory. In various embodiments, the additional user may be selected based on a relatedness to the user in a social network of the user. For example, the additional user may be a friend of the user or a friend-of-a-friend of the user. In various embodiments, the collection module may filter out items that are not of the specific version that the search module determines that the user is searching for. For example, the collection module may not collect data from the user's social network that pertains to the iPhone 3G or iPhone 4 based on the search module determining that the user is searching specifically for the iPhone 5. Alternatively, the collection module may collect data pertaining to the iPhone generally regardless of whether the search module determines that the user is searching specifically for the iPhone 5.

At operation 506, the notification module 306 generates a notification that includes a specification that the user has the item in his personal inventory. In various embodiments, the notification may be used to supplement search results corresponding to the searching for the local retailers by the user. Such search results may include a listing of local retailers that have the item in stock. Thus, for example, the notification module 306 may provide a notification that may be incorporated into search results presented to a user via a local commerce application (e.g., RedLaser), such that the user is presented not only with a list of local retailers that have the item in stock, and various other information pertaining to the item (e.g., price, quantity, description, and so on), but also information about users in the social network of the user who own the item or may be willing to sell the item to the user. In various embodiments, the notification includes information only for additional users in the user's social network who are willing to sell the item to the user.

Figure 6:
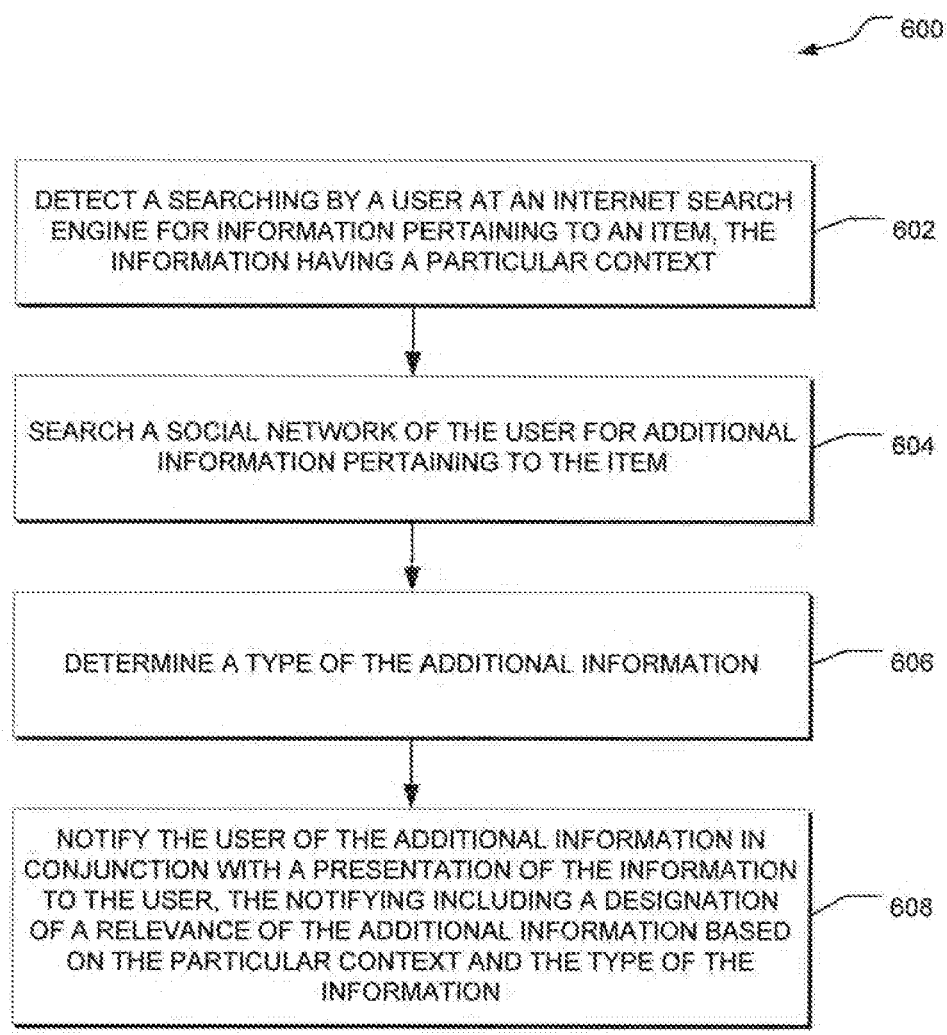
FIG. 6 is a flow chart illustrating an example method of notifying a user of information from a social network of the user that is relevant to a user's search for information about an item.

FIG. 6 is a flow chart illustrating an example method 600 of notifying a user of information from a social network of the user that is relevant to a user's search for information about an item. In various embodiments, the method 600 may be implemented by modules of the social networking integration application(s) 234. At operation 602, the search module detects that a user is searching for information pertaining to an item. Additionally, the search module detects the context in which the user is searching for the information pertaining to the item (e.g., a local commerce context, an internet searching context, an online shopping context, and so on). For example, the search module may detect that the user is searching for information about the item in a local commerce context based on the user scanning a barcode for the item via a local commerce application (e.g., RedLaser). Or the search module may detect that the user is searching for the information pertaining to the item in a general context based on the user entering a search query at a search engine (e.g., Google or Yahoo!). Or the search module may detect that the user is searching for the item in an online shopping context based on the user entering a search term at an Internet commerce web site (e.g., eBay, Amazon.com, and so on).

At operation 604, the collection module searches a second system (e.g., social network of the user) for additional information pertaining to the item. In various embodiments, the second system may be a social networking system of the user (e.g., Facebook® or LinkedIn®). In various embodiments, the second system may be a system associated with a tracking application installed by the user and the additional users. The tracking application may track information provided by the users with respect to the item or monitor and log behavior of the users with respect to the items.

Thus, the additional information may be different information than the information that is presented to the user at a first system (e.g., Google®, Yahoo!®, or eBay®) in response to the user entering a query for the information about the item at the first system. In various embodiments, the collection module collects the additional information about the item from content items (e.g., news feeds) that are accessible to the user via the second system. In various embodiments, the collection module collects the additional information from a database maintained by the first system to store information provided by the additional users or determined based on a monitoring of the additional users. For example, the collection module may access the second system on behalf of the second user to collect the information. In various embodiments, the collection module collects the additional information prior to the detecting of the searching for the information about the item by the user, storing the additional information in a database for later access (e.g., upon a detection of the searching for the information about the item by the user).

At operation 606, the collection module determines a type of the additional information. For example, the collection module determines that the type of the additional information is one of several pre-defined types. Such predefined types may include, for example, knowledge about the item, ownership of the item, feedback provided about the item, a rating of the item, a willingness to sell the item, expertise in using the item, purchase guidance pertaining to the item, and so on.

At operation 608, the notification module notifies the user of the additional information. In various embodiments, the additional information may then be presented to the user along with information that is included in search results provided to the user in response to the query entered by the user at operation 602. In various embodiments, a notification generated by the notification module includes a designation of a relevance of the additional information based on the detected context of the user's search for the information about the item and based on the type of the collected additional information. For example, if a user is searching for information about the item in an online shopping context, the types of the additional information that are most relevant may include shopping guidance or ratings. The notification may then designate such types of the additional information as being more relevant than other types of the additional information (e.g., via a relevance score). In various embodiments, the notification module may also filter the additional information based on a correspondence between the context of the user's search and the type of the information. In this way, the notification module may allow an application to integrate only the most relevant collected additional information into the search results that the application presents to the user in response to the user's query for information about the item.

Figure 7:
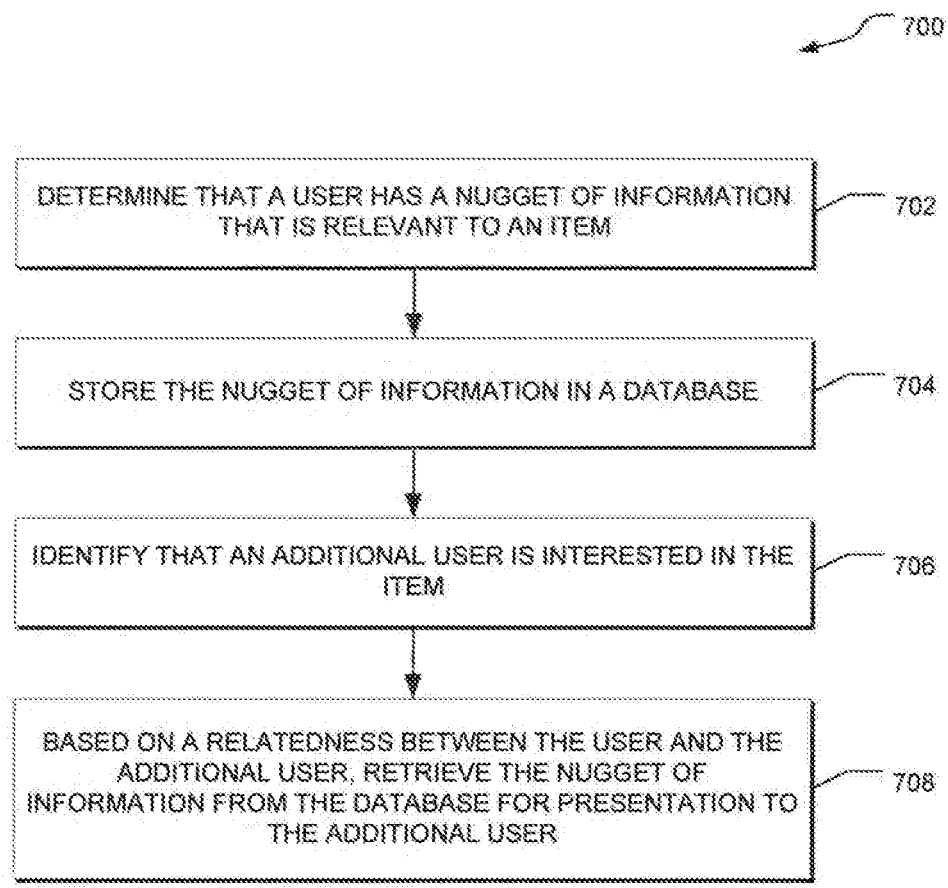
FIG. 7 is a flow chart illustrating an example method of storing nuggets of information that are relevant to items for presentation to additional users who are interested in the items.

FIG. 7 is a flow chart illustrating an example method 700 of storing nuggets of information that are relevant to items for presentation to additional users who are interested in the items. In various embodiments, the method 700 may be implemented by modules of the social networking integration application(s) 234. At operation 702, the collection module determines that a user has a nugget of information that is relevant to an item. For example, the collection module may determine that the user has purchased the item and thus has information pertaining to the cost of the item, where to obtain the item, and so on. Or the collection module may determine that the user has commented on the item and thus has information about a quality of the item, how to use the item, and so on. The nugget of information may be unique information generated by the user (e.g., information posted by the user in a news feed on a social networking system). In other words, it may be different information than what an additional user may be presented with in standard search results presented to the additional user in response to a query initiated by the additional user at a search engine system or via a local commerce application.

At operation 704, the collection module stores the nugget of information about the item. In various embodiments, the collection module prompts the user to provide the information based on a determination that the user has the information. For example, the collection module prompts the user to enter a purchase price of the item based on a determination that the user purchased the item. In other embodiments, the collection module determines the information from information known about the user (e.g., a transaction history, a feedback rating posted by the user, and so on).

At operation 706, the search module identifies that an additional user is interested in the item. For example, the search module identifies that the additional user has entered a search term pertaining to the item at a search engine. Or the search module identifies that the additional user has scanned a bar code corresponding to the item in a local commerce application.

At operation 708, the notification module retrieves the nugget of information from the database for presentation to the user. In various embodiments, the nugget of information is presented to the user instead of or in conjunction with standard search results presented to the user by the application through which the user expressed the interest in the item.

Figure 8:
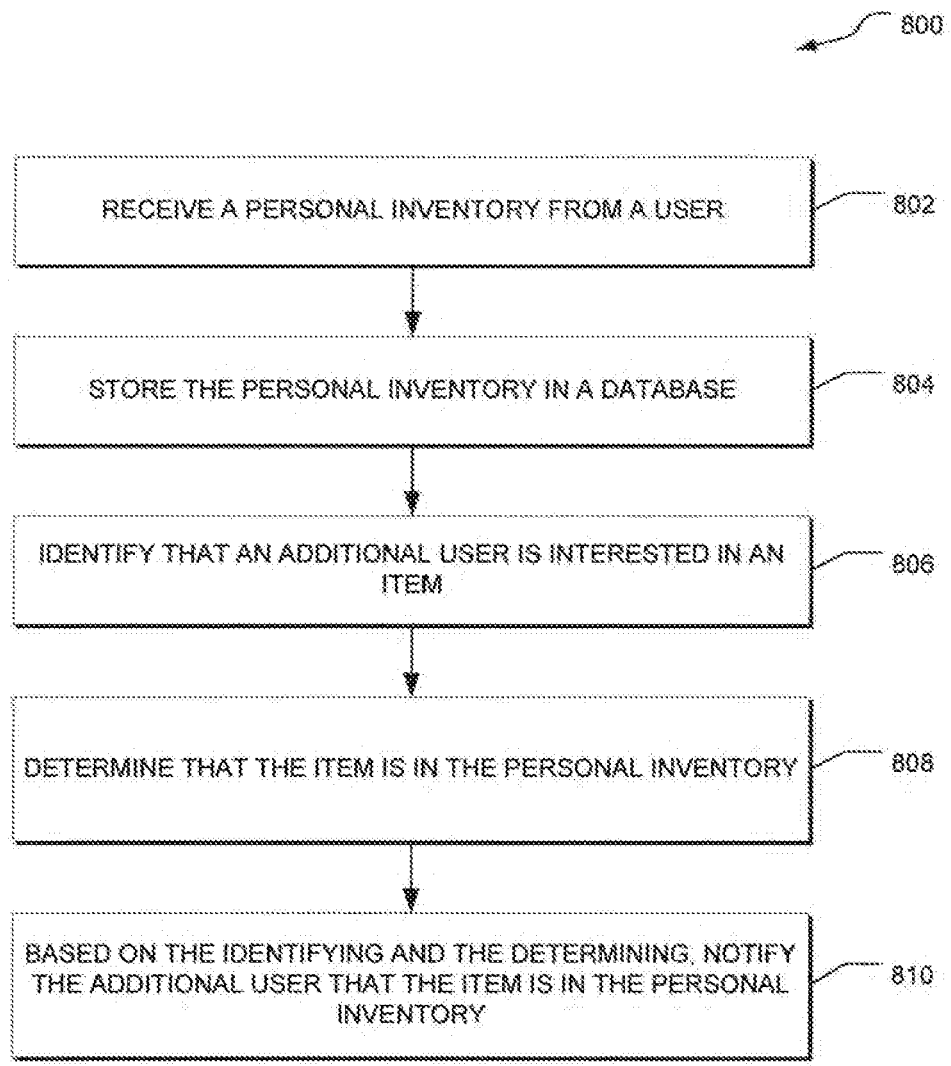
FIG. 8 is a flow chart illustrating an example method of storing nuggets of information that are relevant to items for presentation to additional users who are interested in the items.

FIG. 8 is a flow chart illustrating an example method 800 of storing nuggets of information that are relevant to items for presentation to additional users who are interested in the items. In various embodiments, the method 800 may be implemented by modules of the social networking integration application(s) 234. At operation 802, the inventory module receives a personal inventory from a user. The personal inventory may include information about each of the one or more items, such as the name of the item, the type of the item, the purchase price of the item, whether the user owns the item, whether the user is willing to sell the item, a selling price for the item, a rating of the item, feedback associated with the item, and so on. At operation 804, the inventory module stores the received personal inventory in a database.

At operation 806, the search module determines that an additional user is interested in an item. For example, the search module determines that the user has scanned a bar code for the item using a local commerce application.

At operation 808, the inventory module determines that the item that the additional user is interested in is included in the personal inventory of the user.

At operation 810, the notification module notifies the additional user that the item that the user is interested in is in the personal inventory of the user. The notification module may also notify the user of any of the information about the item that is included in the personal inventory. In various embodiments, the notification module provides the user with information about the item that is included in the personal inventory of the additional user based on a relatedness of the user to the additional user. For example, the notification module provides the additional user with information about the personal inventory of the user based on a determination that the user and the additional users are friends with respect to a social networking system.

Figure 9:
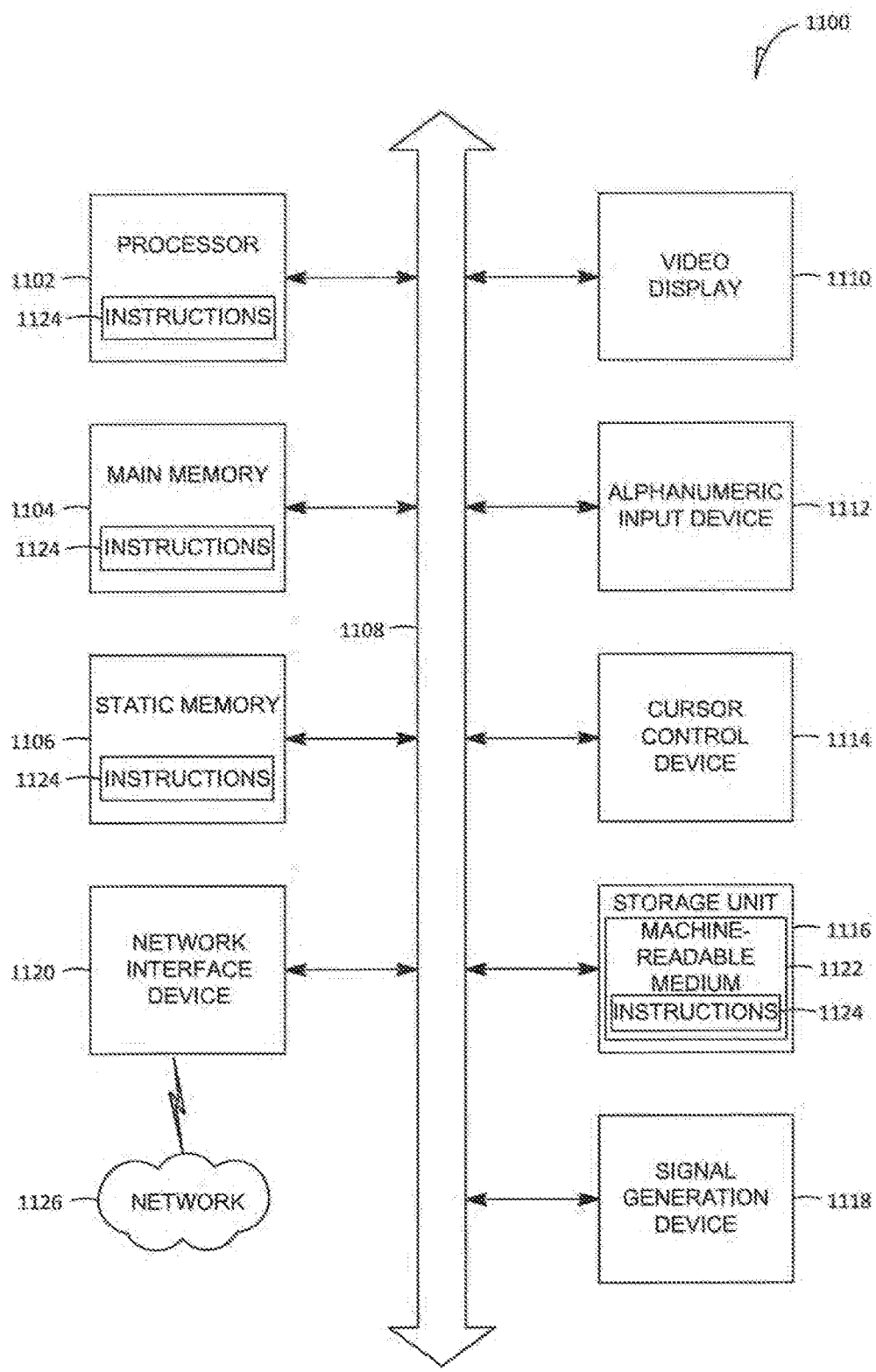
FIG. 9 is a block diagram of a machine in the example form of a computer system within which instructions for causing the machine to perform any one or more of the methodologies discussed herein may be executed.

FIG. 9 is a block diagram of a machine in the example form of a computer system 1100 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface navigation (or cursor control) device 1114 (e.g., a mouse), a storage unit 1116, a signal generation device 1118 (e.g., a speaker), and a network interface device 1120.

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media. The instructions 1124 may also reside, completely or at least partially, within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1124 may further be transmitted or received over a communications network 1126 using a transmission medium. In various embodiments, the network 1126 corresponds to the network 104 of FIG. 1. The instructions 1124 may be transmitted using the network interface device 120 and any one of a number of well-known transfer protocols (e.g., Hyper Text Transfer Protocol (HTTP)). Examples of communication networks include a local area network (LAN), a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more processors;
   one or more modules incorporated into a network-based publication system, the one or more modules implemented by the one or more processors, the one or more modules configured to, at least:
   detect that a user is searching for information about an item by submitting a search using an application executing on a device of the user;
   based on the detecting, collect data relating to the item from a social network of the user, the data relating to the item pertaining to a purchasing of the item by an additional user, the additional user having a relatedness to the user in the social network of the user;
   identify a type of the data as corresponding to one of a plurality of pre-determined types of data, the pre-defined types of data including at least one of knowledge about the item, ownership of the item, feedback provided about the item, a rating of the item, a willingness to sell the item, expertise in using the item, or purchase guidance pertaining to the item;
   determine a relevance score to associate with the data based on a relevance of the type of the data to the search; and
   generate a notification relating to the item, the notification including the data, the relevance score, and a specification of the purchasing of the item by the additional user, to supplement a search result that is to be presented to the user in response to the submitting of the search.

2. The system of claim 1, the processor-implemented module further configured to determine that the additional user has the knowledge based on an identification that the additional user has the item in a personal inventory.

3. The system of claim 1, the processor-implemented module further configured to determine a source of the data, the source being an additional user, and wherein the generating of the notification is based on a relatedness between the user and the additional user.

4. The system of claim 1, wherein:
the item is a service;
the data relating to the item is a rating of an experience of an additional user with respect to the service, the additional user having a relatedness to the user in the social network of the user; and
the notification includes the rating.

5. The method of claim 1, wherein the application is configured to present a search result including at least one of pricing information and inventory information for the item with respect to stores within a proximity to the user.

6. A method comprising:
incorporating instructions into a memory of a marketplace system, an implementation of the instructions by one or more processors of the marketplace system configuring the marketplace system to perform operations, the operations including:
detecting that a user is searching for information about an item by submitting a search using an application executing on a device of the user; and
based on the detecting, performing operations including:
collecting data relating to the item from a social network of the user, the data relating to the item pertaining to a purchasing of the item by an additional user, the additional user having a relatedness to the user in the social network of the user;
identifying a type of the data as corresponding to one of a plurality of pre-determined types of data, the pre-defined types of data including at least one of knowledge about the item, ownership of the item, feedback provided about the item, a rating of the item, a willingness to sell the item, expertise in using the item, or purchase guidance pertaining to the item;
determining a relevance score to associate with the data based on a relevance of the type of the data to the search; and
generating a notification relating to the item, the notification including the data, the relevance score, and a specification of the purchasing of the item by the additional user, to supplement a search result that is to be presented to the user in response to the submitting of the search.

7. The method of claim 6, further comprising determining that the additional user has the knowledge based on an identification that the additional user has the item in a personal inventory.

8. The method of claim 6, further comprising determining a source of the data, the source being an additional user, and wherein the generating of the notification is based on a relatedness between the user and the additional user.

9. The method of claim 6, wherein the item is a service; wherein the data relating to the item is a rating of an experience of an additional user with respect to the service, the additional user having a relatedness to the user in the social network of the user; and
wherein the notification includes the rating.

10. The method of claim 6, further comprising boosting the relevance score based on the type of the data corresponding to one of the following: the purchase guidance pertaining to the item or the rating of the item.

11. A non-transitory machine readable medium embodying a set of instructions that, when incorporated as one or more modules into a network-based publication system, cause one or more processors of the network-based publication system to perform operations, the operations comprising:
detecting that a user is searching for information about an item by submitting a search using an application executing on a device of the user; and
based on the detecting, performing operations including:
collecting data relating to the item from a social network of the user, the data relating to the item pertaining to a purchasing of the item by an additional user, the additional user having a relatedness to the user in the social network of the user;
identifying a type of the data as corresponding to one of a plurality of pre-determined types of data, the pre-defined types of data including at least one of knowledge about the item, ownership of the item, feedback provided about the item, a rating of the item, a willingness to sell the item, expertise in using the item, or purchase guidance pertaining to the item;
determining a relevance score to associate with the data based on a relevance of the type of the data to the local commerce search; and
generating a notification of the data relating to the item, the notification including the data, the relevance score, and a specification of the purchasing of the item by the additional user, to supplement a search result that is to be presented to the user in response to the submitting of the search.

12. The non-transitory machine readable medium of claim 11, the operations further comprising determining that the additional user has the knowledge based on an identification that the additional user has the item in a personal inventory.

13. The non-transitory machine readable medium of claim 11, the operations further comprising determining a source of the data, the source being an additional user, and wherein the generating of the notification is based on a relatedness between the user and the additional user.

* * * * *